United States Patent
Muth et al.

(10) Patent No.: US 9,172,290 B2
(45) Date of Patent: Oct. 27, 2015

(54) METHOD FOR UNBALANCE CORRECTION OF ROTORS BY APPLYING CORRECTIVE WEIGHTS BY WELDING

(71) Applicant: Schenck RoTec GmbH, Darmstadt (DE)

(72) Inventors: Christian Muth, Fischbachtal (DE); Martin Rogalla, Darmstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 217 days.

(21) Appl. No.: 13/911,295

(22) Filed: Jun. 6, 2013

(65) Prior Publication Data

US 2014/0007414 A1    Jan. 9, 2014

(30) Foreign Application Priority Data

Jul. 3, 2012 (DE) .................. 10 2012 105 893

(51) Int. Cl.
    *H02K 7/04*      (2006.01)
    *H02K 15/16*     (2006.01)

(52) U.S. Cl.
    CPC ......... *H02K 15/165* (2013.01); *Y10T 29/49004* (2015.01); *Y10T 29/53143* (2015.01)

(58) Field of Classification Search
    CPC ........... G01M 1/02; G01M 1/16; G01M 1/30; G01M 1/32; H02K 15/165; Y10T 29/53143; Y10T 29/49004
    See application file for complete search history.

(56) References Cited

U.S. PATENT DOCUMENTS

| | | | |
|---|---|---|---|
| 7,249,508 B2 * | 7/2007 | Rogalla et al. | 73/468 |
| 8,336,379 B2 | 12/2012 | Rogalla et al. | |
| 2004/0030666 A1 * | 2/2004 | Marra et al. | 706/48 |

FOREIGN PATENT DOCUMENTS

| | | |
|---|---|---|
| DE | 34 34 746 A1 | 3/1986 |
| DE | 10 2007 014 461 A1 | 7/2008 |
| DE | 10 2010 001 999 A1 | 9/2011 |
| JP | S56-012529 A | 2/1981 |
| JP | H07-035200 A | 2/1995 |
| WO | WO 2004/005878 A1 | 1/2004 |
| WO | WO 2010/054999 A1 | 5/2010 |

OTHER PUBLICATIONS

United Kingdom Search Report of GB1311851.8, dated Dec. 22, 2013.

* cited by examiner

*Primary Examiner* — Carl Arbes

(74) *Attorney, Agent, or Firm* — Collard & Roe, P.C.

(57) ABSTRACT

To correct an unbalance of rotors, a method and a device are proposed by means of which a corrective weight (15) is adapted to be welded to a rotor (2) by means of an electric welding device (14). The device comprises a robot (20) with a jointed arm (21) mounting the electric welding device (14). Arranged within reach of the jointed arm (21) is an unbalance measuring station (1) for measuring the amount of unbalance of the rotor (2) with an electronic computer which computes a corrective weight (15) to be attached to the rotor (2) for unbalance correction and transmits control data to a control device (23) of the robot (20). Under robot control, the welding device (14) picks the computed corrective weight (15) from a magazine (27) arranged within reach of the jointed arm (21) and welds it to the rotor (2) in the unbalance measuring station (1). During the welding operation the rotor (2) takes support on a first supporting device (11) and the welding device (14) on a second supporting device (12).

8 Claims, 3 Drawing Sheets

METHOD FOR UNBALANCE CORRECTION OF ROTORS BY APPLYING CORRECTIVE WEIGHTS BY WELDING

CROSS REFERENCE TO RELATED APPLICATIONS

Applicant claims priority under 35 U.S.C. §119 of German Patent Application No. 10 2012 105 893.8 filed Jul. 3, 2012.

FIELD OF THE INVENTION

This invention relates to a method for correcting an unbalance on rotors, which includes applying by welding at least one corrective weight by means of an electric welding device to a wall of each rotor to be balanced, and to a device for implementing the method.

DESCRIPTION OF RELATED ART

From WO 2010/054999 A1 it is known to correct an unbalance on cup-shaped rotors of electric machines by attaching a corrective weight to a cup wall of the rotor by means of a resistance projection welding process. Resistance projection welding is an electric resistance pressure welding process using plane, large-area electrodes for pressing the workpieces to be joined against each other at a pressing force and passing an electrical current therethrough. Contact between the workpieces is limited to raised sections which cause a concentration of current at the joint. As a result of the contact pressure and the heat developed by the electrical current, the raised sections are largely back-deformed during welding, causing welds to be formed which join the workpieces together. In the known method, small steel plates provided with a welding projection are used as corrective weights. For welding-on, the rear side of a plate is placed on a welding electrode, positioned at the proper angle by means of a plastic part and held in place by a magnet. Current conduction to the cup wall of the rotor is by means of a counter-electrode which is arranged on the side adjacent to the welding electrode. The manner of supporting the rotor and the welding device in opposition to the contact pressure is not revealed in this disclosure.

It is also known from WO 2010/054999 A1 to achieve complete unbalance correction by attaching two corrective weights arranged at an angular distance to each other. The purpose of this is to be able to correct a wide range of unbalanced conditions using but a few different standard weights. In addition, the susceptibility to faults with regard to the arrangement of the corrective weights is to be reduced.

WO 2004/005878 A1 discloses a device for attaching corrective weights to propeller shafts or drive shafts in a balancing machine which includes a clamp-type device adapted to be positioned longitudinally to the shaft axis and having superposed clamping units which are provided with electrodes for projection welding corrective weights to the outer circumference of the shafts. The clamping units are floating-mounted in the clamp in-feed direction and movable relative to each other by means of a feed unit to increase or reduce their relative distance. For welding on, a corrective weight is placed on the electrode of the lower clamping unit, and the feed unit first presses the electrode of the upper clamping unit against the shaft. As a result of the counterforce of the feed unit acting on the lower clamping unit, the corrective weight is likewise brought into pressure contact with the shaft by the lower electrode and welded to the shaft by activation of the welding current.

Moreover, DE 34 34 746 A1 discloses a welding installation using an industrial robot which has a pivotal jointed arm with a gripper attached to it. Moved by the robot, the gripper picks a part to be welded-on from a parts magazine and deposits it on a programmed weld junction of a workpiece. The supply of current welds the attachment to the workpiece at the points of contact. In this disclosure, the welded connection is only required to withstand the weight force of the welded attachment because finish welding of the joint takes place subsequently using a respot welding tool.

SUMMARY OF THE INVENTION

Each of the known devices for welding-on corrective weights is tailored to specific applications and not suited to accommodate a wide variety of rotor types and rotor configurations. It is therefore an object of the present invention to provide a method and a device for rotor balancing by welding on a corrective weight by means of an electric welding device which are able to accommodate many different types of rotor. It should be possible for the corrective weights to come in different sizes and shapes and to be welded to the rotors on various correction radii and at various angles. In addition, it should be possible to perform unbalance correction automatically.

According to the present invention, the method of correcting rotor unbalance in which at least one corrective weight is attached by welding to a wall of a rotor to be balanced by means of an electric welding device comprises the following steps:

attaching the electric welding device to a jointed arm of a robot;

measuring the amount of unbalance of the rotor to be balanced;

computing a corrective weight to be applied to a selected area on the rotor for unbalance correction;

supplying a corrective weight computed for unbalance correction to a defined transfer position within reach of the jointed arm;

moving the welding device by means of the robot to the transfer position and picking up the computed corrective weight by the welding device;

turning the rotor to a weld-on position and supporting the rotor in said weld-on position on a first supporting device in opposition to the contact pressure produced by the welding device during the welding process;

moving the welding device by means of the robot to the weld-on position on the rotor and supporting the welding device in the weld-on position on a second supporting device in opposition to the reaction force of the contact pressure produced by the welding device during the welding process, which second supporting device is arranged adjacent to the rotor and fixedly connected with the first supporting device;

firmly pressing and welding the corrective weight to the rotor balancing position selected for unbalance correction.

In applying the method of the present invention, it is largely independent of the size and shape of the rotors to be balanced and the structural design of the unbalance measuring station for measuring the unbalance to be corrected. Depending on the requirements, the corrective weights can be welded either radially to a circumferential surface of a rotor or axially to a rotor end surface at various angles. Another essential advantage of the method of the present invention results by supporting the welding device in the weld-on position on a supporting device adjacent to the rotor. This prevents the jointed arm from being loaded by the reaction force of the contact pressure produced during projection welding. As a result, it enables the jointed arm to be manufactured to comparatively light weight and economically. Position changes of the jointed arm due to loads are avoided and unable to affect the accuracy of position when applying the corrective weight.

According to the invention, welding is performed preferably by means of electric resistance welding, in particular resistance projection welding, with at least one projection being formed only on the corrective weight. The advantage of this method is that a surface deformation occurs during welding essentially on one side of the corrective weight and that the surface of the rotor is changed only very little. Any metal suitable for welding may be considered for manufacture of the corrective weights.

According to the invention, each corrective weight computed for unbalance correction may be cut to length from a coil by means of an automatic cutting device, shaped to a form suitable for welding and then supplied for use.

Another advantageous embodiment of the method of the present invention may include supplying a plurality of corrective weights of different sizes in defined transfer positions in a magazine arranged within reach of the jointed arm, with the respective transfer position in which a corrective weight of a size computed for balancing being determined and transmitted to the control unit of the jointed arm. For the process, cylindrical corrective weights of like diameter and different lengths or corrective weights of like length and different diameters may be used.

The operations of picking and holding the corrective weights in the welding device may be performed by mechanical grippers, with the envelope surface of the corrective weights being advantageously provided with a step or a circumferential groove. Alternatively, pneumatic suction grippers or magnetic or electromagnetic grippers may be used.

A device for implementing the method comprises according to the invention a robot with a jointed arm mounting the electric welding device and with an electric control device for controlling the movement of the jointed arm and for controlling the welding device, within reach of the jointed arm an unbalance measuring station for measuring the amount of unbalance of the rotor to be balanced, an electronic computer connected to the unbalance measuring station and the electric control device of the robot, the computer being constructed to compute a corrective weight to be attached for unbalance correction to a defined balancing position on the rotor and to transmit the computed data to the electric control device of the robot, and a supply device arranged within reach of the jointed arm for supplying the computed corrective weight, with the unbalance measuring station mounting a first supporting device for firmly supporting the rotor and a second supporting device for firmly supporting the welding device.

The device of the invention affords ease and economy of manufacture and is suitable for unbalance correction on a wide variety of rotors.

According to the present invention, the first supporting device may be a clamping device for fixedly clamping the rotor. Alternatively, the first supporting device may include a floating-mounted first supporting element which is adapted to be engaged against the rotor and is fixedly connected with the equally floating-mounted second supporting device by a force-transmitting connecting element. This configuration enables the bearing forces of the first and second supporting device to be compensated for by the floating mounting on the rotor so that the rotor mounting is not affected by notable external forces originating from the supporting devices. In this case, it is also possible for the rotor to remain clamped in the mounting of the unbalance measuring station during the welding process and does not have to be detached from it.

For adaptation to various rotor diameters the distance between the first and second supporting device may be variable.

According to the invention, the second supporting device has arranged on the unbalance measuring station a second supporting element upon which the welding device is adapted to take support in opposition to the reaction force of the contact pressure urging the corrective weight against the rotor during a welding operation. The second supporting element may be fixedly connected with the unbalance measuring station or be floating-mounted on the unbalance measuring station.

According to the invention, the supply device may include an automatic cutting device enabling corrective weights computed for the respective unbalance correction to be cut to length from a coil and be formed into a shape suitable for welding-on.

In another advantageous configuration, the supply device may be in the form of a magazine arranged within reach of the jointed arm and holding a plurality of corrective weights of different sizes, with the corrective weights being arranged in defined transfer positions and the control device of the unbalance measuring station including software for computing the respective transfer position in which a corrective weight of the size computed for unbalance correction is held in the magazine. Such a configuration of the supply device is suited in particular for such shapes of corrective weights as are manufactured to various sizes from steel, as by cold working, at a site separate from the site of the device for unbalance correction, and whose shape design is unsuitable for individual on-site manufacture in automatic cutting devices.

According to the invention, the welding device preferably includes a gripper for picking up a corrective weight, a welding electrode for connection to the corrective weight, an actuator for pressing the corrective weight into contact with the rotor, and a counter-electrode adapted to be connected to the rotor. The welding device may furthermore include a housing, and the welding electrode may be of a rod-shaped configuration and be carried in an axially movable and electrically insulated manner in the housing, with a forward end of the welding electrode having a frontal contact surface arranged in the gripper area while a rear end of the welding electrode is connected to a piston of a pneumatic cylinder forming the actuator. In addition, the welding electrode may take support on the housing via a return spring enabling it to be moved in the direction of the actuator. The counter-electrode may be arranged adjacent to the gripper on the housing and include a contact head resiliently supported on the housing.

BRIEF DESCRIPTION OF THE DRAWING

The present invention will be explained in more detail in the following with reference to embodiments illustrated in the accompanying drawings. In the drawings.

BRIEF DESCRIPTION OF THE DRAWINGS

Figure 1:
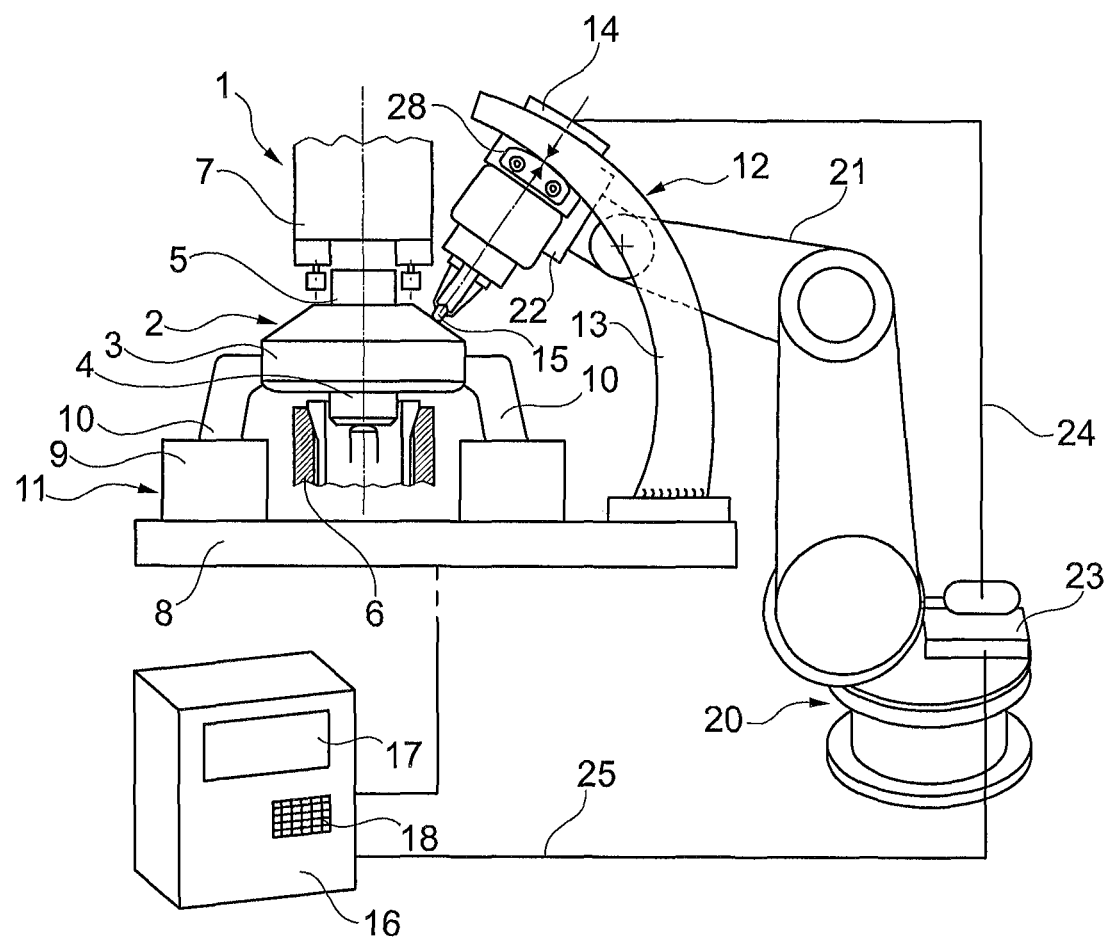
FIG. 1 is a view of a device for unbalance correction on an unbalance measuring station and with a magazine holding corrective weights of different sizes.

FIG. 1 shows a section of an unbalance measuring station 1 for measuring and correcting the unbalance of a rotor 2, for example, a torque converter. The rotor 2 has a cup-shaped housing 3 and cylindrical bearing sections 4, 5 at its ends. With its bearing section 4 the rotor 2 is received in a measuring spindle 6, provided with a holding clamp, of the unbalance measuring station 1. The bearing section 5 is rotatably carried in a bearing 7 coaxial with the measuring spindle 6 and axially movable for loading the rotor. The measuring spindle 6 and the bearing 7 are part of a unit mounted for oscillation on a machine bed 8, its oscillations being measurable by means of oscillation sensors.

A clamping device 9 including several clamping arms 10 to form a first supporting device 11 is arranged on the machine bed 8 at a location separate from the oscillatory unit. The clamping device 9 is operable to clamp the rotor 2 by its housing 3, thereby fixedly connecting it to the machine frame 8.

Also arranged on the machine bed 8 at an essentially radial distance from the rotor 2 is a second supporting device 12 having a supporting element 13 extending in the shape of a bent arm in the direction of the rotor axis, its concave side facing the rotor 2. The supporting element 13 serves to support a welding device 14 for welding a corrective element 15 to the rotor 2. The bent shape of the supporting element 13 enables supporting on the supporting element 13 in the direction of the normal in various welding positions of the welding device 14. The supporting element 13 may be secured to the machine bed 8 for adjustment radially to the measuring spindle 6 in order to be able to match the distance between the supporting element and the outer surface of the rotor to various rotor diameters.

Associated with the unbalance measuring station 1 is a central processing unit 16 having a screen 17 and an input device 18. In addition to controlling the unbalance measuring station 1, the central processing unit 16 serves to evaluate the oscillation signals and to compute the amounts of unbalance of measured rotors. It includes an electronic computer, a data memory, and means for processing the signals received from the oscillation sensors of the unbalance measuring station.

To manipulate the welding device 14, the unbalance measuring station 1 mounts a robot 20 with a jointed arm 21 including electric joint drives and at its free end a hand element 22 movable about several axes and mounting the welding device 14. The robot 20 has an electric control device 23 by means of which the movements of the jointed arm 21 and of the hand element 22 are controllable. The control device 23 is furthermore adapted to control the welding device 14 and connected to it by a control line 24. In addition, the control device 23 is connected to the central processing unit 16 via a data-transmission line 25. It is through this line that the control device 23 receives the control data it needs to control the automatic welding of a corrective weight of predetermined size to a predetermined position on the respective rotor 2.

Arranged within reach of the jointed arm 21 of the robot 20 is a magazine 27 holding available a plurality of corrective weights 15 of different sizes in various positions to be picked up by there by the welding device 14. In the magazine the corrective weights, sorted by size, are assigned to various supply positions. Accordingly, it is possible for a corrective weight of a specific size to be picked up by movement of the welding device 14 to a predetermined supply position assigned to the corrective weight 15.

To perform an unbalance correction by means of the device described, a measuring run of the rotor 2 loaded into the unbalance measuring station 1 first measures the oscillation behavior of the rotatably driven rotor 2. During the measuring run, the rotor 2 has its bearing section 4 firmly clamped in the measuring spindle 6. The clamping device 9 is released, and the clamping arms 10 are retracted from their clamping position by an amount enabling the rotor 2 held in the measuring spindle 6 and the bearing 7 to freely oscillate radially with these. The computer of the central processing unit 16 calculates from the oscillation data obtained during the measuring run the amount of unbalance to be corrected in terms of rotational angle position and size and determines the corrective weight 15 to be applied and its supply position in the magazine 27. This data is also transmitted to the control device 23 of the robot 20. At the same time, the rotor 2, brought to a standstill in the unbalance measuring station 1, is rotated into a rotational angle position suitable for attaching the corrective weight 15 and is held clamped in this position by means of the clamping device 9. The holding clamp of the measuring spindle 6 is released in the process to avoid constraining forces and overloading of the measuring spindle mount.

Using the data transmitted, the control device 23 effects in a first step a movement of the welding device 14 to a transfer position on the magazine 27, in which position a corrective weight of predetermined size can be picked up by the welding device 14. The welding device 14 carrying the corrective weight 15 is then moved to the unbalance measuring station and brought to a position provided for welding on the corrective weight. In this position, the axis of the welding device 14 is directed essentially perpendicular to the point where the corrective weight 15 is to be welded to an outer surface of the rotor 2. In addition, the welding device 14 bears with a bearing section 28 against the supporting element 13 in a manner supporting the welding device 14 on the supporting element 13 in opposition to the contact pressure produced during the welding operation. As soon as the welding device 14 is in the welding position described, the control device 23 activates the welding operation, causing the welding device to weld the corrective weight to the rotor 2. Following welding, the welding device 14 is moved to a position of rest remote from the rotor 2, the clamping device 9 is opened, and the holding clamp of the measuring spindle is again closed. A check is performed by repeating the measuring run, and the process cycle described is repeated if necessary.

Figure 2:
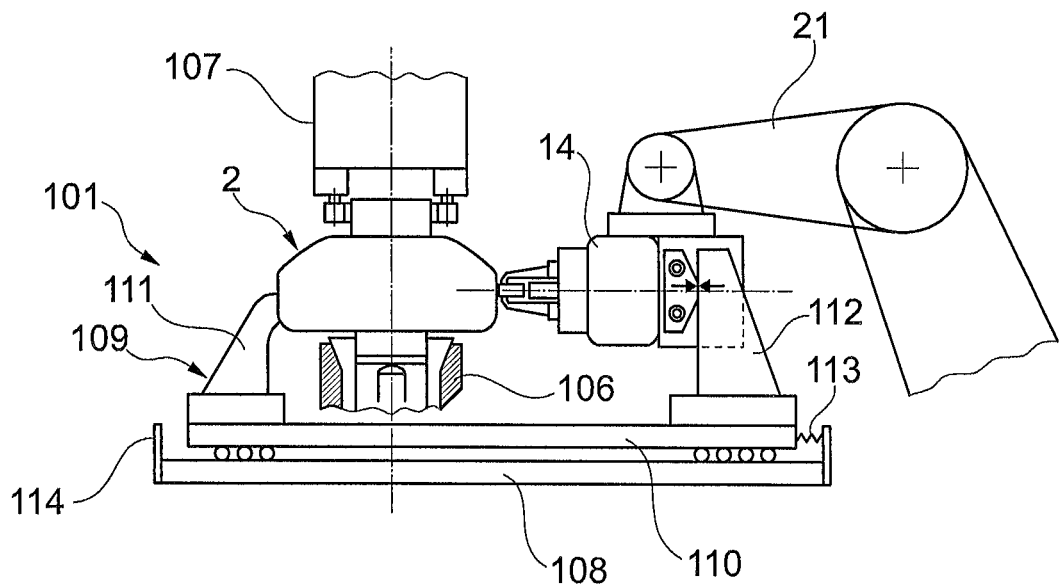
FIG. 2 is a view of a device for unbalance correction with floating-mounted supports.

FIG. 2 shows an unbalance measuring station 101 having a measuring spindle 107 and a bearing 107 carrying a rotor 2. The unbalance measuring station 101 includes a machine bed 108 mounting a supporting device 109 for linear movement in a direction transverse to the axis of rotation of the unbalance measuring station 101. The supporting device 109 comprises a connecting element 110 extending in its direction of movement and having at its one end a first supporting element 111 for supporting the rotor 2 and at its other end a second supporting element 112 for supporting the welding device. The supporting elements 111, 112 are opposite one another and flexurally stiff. The distance between the supporting elements 111, 112 is dimensioned sufficiently large to enable the rotor and the welding device arranged on the rotor 2 in the welding position to be accommodated in the space between the supporting elements 111, 112. A spring 113 holds the supporting device 109 against a stop 114 in a rest position in which the supporting element 111 is remote from the rotor 2. With the supporting device 109 in this position intended for the measuring run, the rotor is able to rotate freely and oscillate radially.

For welding on a corrective weight, the welding device 14 is introduced by means of the jointed arm 21 into the space between the supporting element 112 and the rotor 2, whereby the supporting device 109 is displaced in opposition to the force of the spring 113 and the supporting element 111 is moved into abutment with the rotor 2. As this occurs, the welding device 14 is aligned so that its longitudinal axis extends essentially parallel to the direction of movement of the supporting device 109 and radially to the rotor 2. During the welding operation, the reaction force of the contact pressure applied by the welding device 14 is transmitted to the supporting element 112 and supported by the latter, via the connecting element 110 and the supporting element 111, at a point on the rotor 2 opposite the welding point. In this manner, the external forces acting on the rotor 2 during the welding operation counterbalance each other. The mounting of the rotor 2 in the unbalance measuring station 101 is therefore not exposed to notable loads during welding on of a corrective element, which enables the rotor 2 to be maintained in clamped position in the measuring spindle 106 during the welding process.

Figure 3:
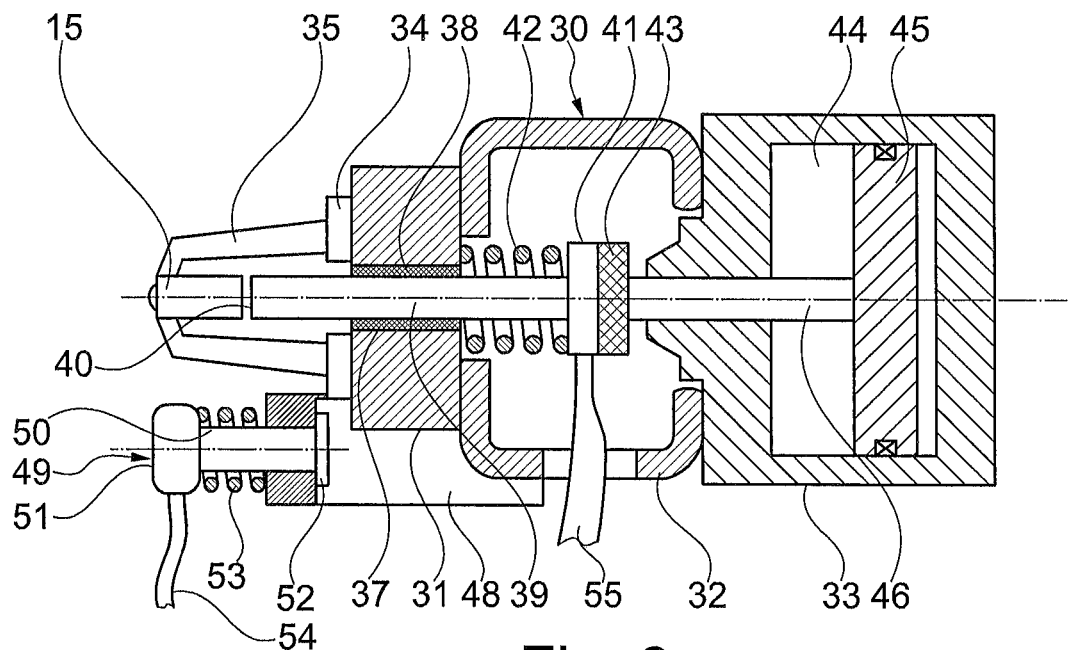
FIG. 3 is a cross-sectional view of a welding device for welding-on corrective weights.

FIG. 3 shows an embodiment of the welding device 14 for resistance projection welding of corrective weights. The welding device 14 has a housing 3 extending longitudinally to an axis and being composed of a front section 31, a middle section 32 and a rear cylinder section 33. Arranged on the front section 31 is a gripper 34 having two gripper fingers 35 directed in forward direction. The gripper fingers 35 have their ends bent towards each other to enable them to grip, by frictional engagement, a cylindrical corrective weight 15 by its envelope surface.

The front section 31 is provided with a central axial through bore 37 into which a cylindrical insulating sleeve 38 is inserted. The insulating sleeve 38 forms an electrically insulating sliding guide for a rod-shaped welding electrode 39 which extends through the insulating sleeve 38 and has at its end arranged between the gripper fingers 35 a contact surface 40 for the corrective weight 15. The rear end of the welding electrode 39 extends into a hollow space in the middle section 32 where it has a head 41 of increased diameter. Seated between the head 41 and the front section 31 is a return spring 42 surrounding the welding electrode 39. The end surface of the head 41 on the side close to the cylinder section 33 carries an insulating plate 43 for electric insulation.

The cylinder section 33 comprises a cylinder chamber 44 and a piston 45 which is movable in the direction of the middle section 32 by pneumatic means. A piston rod 46 leads from the piston 45 to the insulating plate 43 and ensures the transmission of a pressure force generated by the piston 45 to the welding electrode 39. The return spring 42 returns the piston to a rest position.

A holder 48 mounts a counter-electrode 49 arranged on the front section 31 adjacent to the gripper 34. The counter-electrode 49 has a stem 50 mounted for axial movement in a bore of the holder and carrying at a forward end a contact head 51 and at a rear end an abutment head 52. Seated on the stem 50 between the contact head 51 and the holder 48 is a compression spring 53 serving to resiliently urge the contact head 51 against a rotor. For connection to a power source, the welding electrode 39 and the counter-electrode 49 are provided with connecting leads 54, 55.

As described in the foregoing, for welding on a corrective weight 15, the welding device 14 holding a corrective weight 15 in its gripper 34 is moved by the robot 20 to the appropriate position on a rotor 2 to be balanced, taking support upon the supporting device 12 or 109. In this position, the welding device 14 is at such a small distance from the rotor 2 that the projecting counter-electrode 49 is urged against the rotor by the compression spring 53. To perform the welding operation, the piston 45 is acted upon by compressed air, thereby urging the welding electrode 39 against the corrective weight 15 and the corrective weight 15 against the rotor 2 by overcoming the force of the return spring. The welding electrode 39 and the counter-electrode 49 are then connected to a power source, and the corrective weight 15 is welded to the rotor 2. The welding operation is completed by turning off the power source and removing the pressure from the piston 45.

Figure 4:
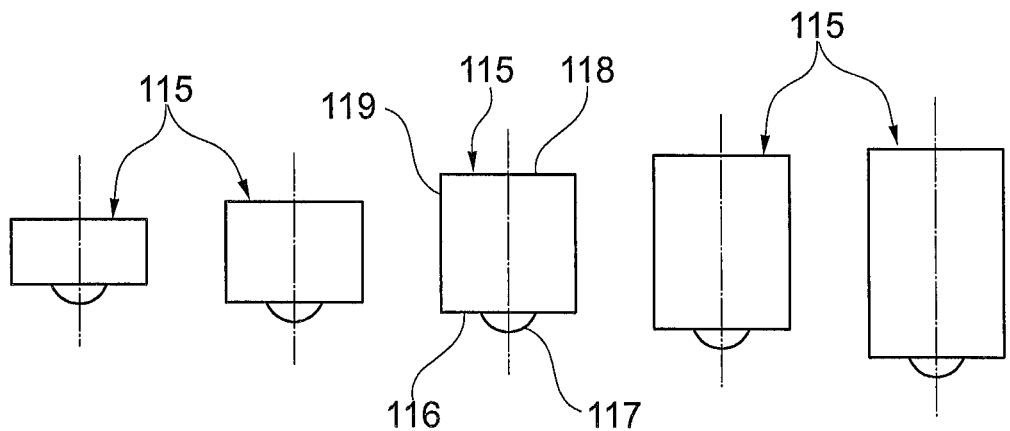
FIGS. 4 to 7 are views of various corrective weights for the method of the invention.

FIG. 4 shows several corrective weights 115 of cylindrical shape which are of like diameter but of different lengths. A forward end surface 116 of the corrective weights has in its center a raised projection 117 for welding on. The other, rear end surface 118 forms a contact surface for the welding electrode. The uniform diameter of the corrective weights 115 enables them to be picked up with a resiliently expandable gripper which embraces the envelope surface 119 of the corrective weights 115.

Figure 5:
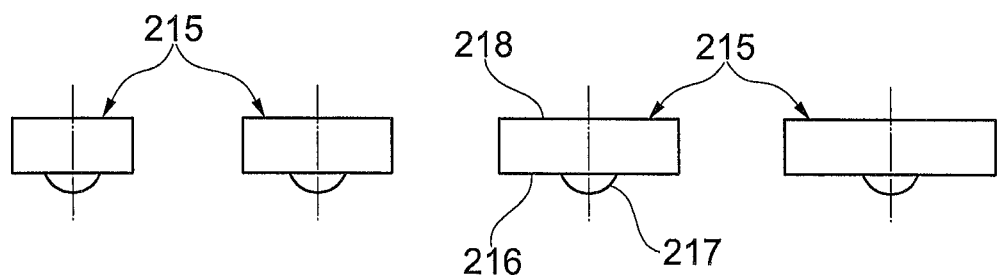

FIG. 5 shows several corrective weights 215 of like length, different diameters and parallel end surfaces 216, 218 of which the forward ones are provided with projections 217. Advantageously, the corrective weights 215 can be picked up with an adjustable or a magnetic gripper.

Figure 6:
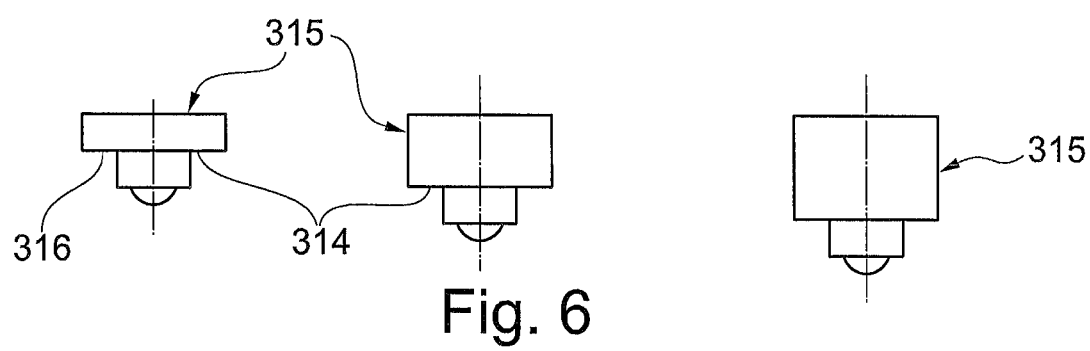

FIG. 6 shows corrective weights 315 provided with a stepped gripping zone 314. The step 316 enables the corrective weights 315 to be gripped by positive engagement and handling of the corrective weights 315 to be improved. The dimensions of the gripping zone 314 are alike on all sizes of the corrective weights 315.

Figure 7:
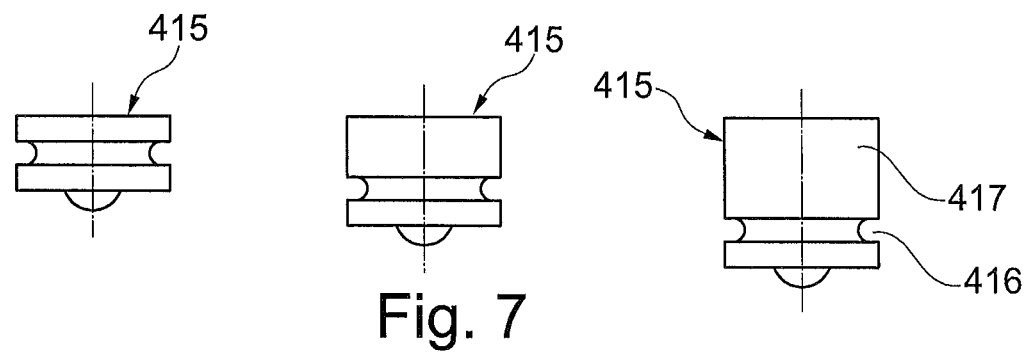

FIG. 7 shows various cylindrical corrective weights 415 of like diameter and with a circumferential groove 416 in the envelope surface 417. The groove 416 enables the engagement of projections provided on the gripper fingers of the welding device in order to ensure reliable handling of the corrective weights 415.

What is claimed is:

1. A method of correcting an unbalance on rotors in which at least one corrective weight is attached by welding to a wall of a rotor to be balanced via an electric welding device, with the corrective weight being pressed into contact during welding at a contact pressure produced by the welding device, comprising the following steps:
    attaching the electric welding device to a jointed arm of a robot,
    measuring, via an unbalance measuring station, the amount of unbalance of the rotor to be balanced,
    computing, via an electronic computer connected to the unbalance measuring station, the corrective weight to be applied to a selected area on the rotor for unbalance correction,
    supplying a computed corrective weight to a defined transfer position within reach of the jointed arm,
    moving the welding device via the robot to the transfer position and picking up the corrective weight computed for unbalance correction by the welding device,
    turning the rotor to a weld-on position and supporting the rotor in said weld-on position on a first supporting device acting in opposition to the contact pressure of the welding device,
    moving the welding device via the robot to the weld-on position on the rotor and supporting the welding device in the weld-on position on a second supporting device arranged adjacent to the rotor and acting in opposition to the reaction force of the contact pressure of the welding device, and
    firmly pressing and welding the corrective weight to the balancing position of the rotor selected for unbalance correction.

2. The method according to claim 1, wherein welding-on of the corrective weights is performed via an electric resistance welding process.

3. The method according to claim 2, wherein welding-on of the corrective weights is performed via an electric resistance projection welding process, with at least one welding projection being formed only on the corrective weight.

4. The method according to claim 1, wherein each computed corrective weight is cut to length from a coil via an automatic cutting device and shaped to a form suitable for welding.

5. The method according to claim 1, comprising supplying a plurality of corrective weights of different sizes in defined transfer positions in a magazine arranged within reach of the jointed arm, with the respective transfer position in which a corrective weight of a size computed for unbalance correction being determined and transmitted to the control unit of robot for control of the jointed arm.

6. The method according to claim 5, wherein cylindrical corrective weights of like diameter and different lengths are used.

7. The method according to claim 5, wherein corrective weights of like length and different diameters are used.

8. The method according to claim 5, wherein the envelope surface of the corrective weights is provided with a step or a circumferential groove.

\* \* \* \* \*